United States Patent [19]

Leigh-Monstevens

[11] Patent Number: 5,035,158
[45] Date of Patent: Jul. 30, 1991

[54] ELECTRIC SHIFT AND TRANSFER CASE APPARATUS WITH CONTROL SYSTEM THEREFORE

[75] Inventor: Keith V. Leigh-Monstevens, Troy, Mich.

[73] Assignee: Automotive Products (USA) Inc., Auburn Hills, Mich.

[21] Appl. No.: 412,007

[22] Filed: Sep. 25, 1989

[51] Int. Cl.$^5$ .................. F16H 61/34; B60K 12/34
[52] U.S. Cl. ........................................ 74/866; 180/233
[58] Field of Search .................. 74/866, 335, 337.5; 475/1, 2, 3, 4, 7; 180/247, 233

[56] References Cited

U.S. PATENT DOCUMENTS

| 2,281,734 | 5/1942 | Whittaker | 171/97 |
| 2,634,622 | 4/1953 | Cripe | 74/335 |

(List continued on next page.)

FOREIGN PATENT DOCUMENTS

| 0134646 | 3/1985 | European Pat. Off. |
| 0310275 | 4/1989 | European Pat. Off. |
| 0310387 | 4/1989 | European Pat. Off. |
| 0316300 | 5/1989 | European Pat. Off. |
| 0316301 | 5/1989 | European Pat. Off. |
| 0316302 | 5/1989 | European Pat. Off. |
| 0316303 | 5/1989 | European Pat. Off. |
| 0328299 | 8/1989 | European Pat. Off. |
| 0328362 | 8/1989 | European Pat. Off. |
| 3827660 | 3/1989 | Fed. Rep. of Germany |
| 5449685 | 5/1981 | Japan |
| 58-137647 | 8/1983 | Japan |
| 5813764 | 8/1983 | Japan |
| 6040850 | 3/1985 | Japan |
| 8903319 | 4/1989 | PCT Int'l Appl. |
| 635278 | 3/1983 | Switzerland |
| 1295060 | 11/1972 | United Kingdom |
| 1455606 | 11/1986 | United Kingdom |

OTHER PUBLICATIONS

Society of Automotive Engineers (SAE) Papers No. 861050, pp. 162-165, No. 831776, 861170, 850782.
SAE Paper 810949.
SAE Paper 831776.
SAE Paper 840448.
SAE Paper 850289.
SAE Paper 850782.
SAE Paper 860652.
SAE Paper 845094.
SAE Paper 861170.
SAE Paper 820392.
SAE Paper 820909.
SAE Paper 820920.
SAE Paper 830880.
SAE Paper 841307.

(List continued on next page.)

Primary Examiner—Allan D. Herrmann
Assistant Examiner—Khoi Q. Ta
Attorney, Agent, or Firm—Krass & Young

[57] ABSTRACT

An electronic control system for a motor vehicle automatic transmission assembly of the type including an automatic transmission and a transfer case connected to the output of the automatic transmission. The automatic transmission has a mode select shaft to position the transmission in its various shift modes and includes a plurality of serially arranged planetary gear sets which are selectively engagable to provide the various shift modes of the transmission including the various forward speeds of the transmission. Solenoid valves are provided to control each planetary gear set so as to provide a direct drive or a speed reduction through that gear set. The invention control system includes a push-button module positioned in the passenger compartment of the motor vehicle providing input signals to a microprocessor. The microprocessor generates a first set of command signals for shifting the transmission between its various shift modes in response to operator selection of a particular push-button, a further set of command signals to automatically shift the transmission between its various forward speeds with the transmission in a forward drive mode, and a further set of command signals to shift the transfer case between its various drive modes in response to operator selection of a push-button corresponding to a transfer case shift mode.

15 Claims, 3 Drawing Sheets

U.S. PATENT DOCUMENTS

| | | | |
|---|---|---|---|
| 3,277,734 | 10/1966 | Bernard | 74/335 |
| 3,573,582 | 4/1971 | Petrocelli | 318/305 |
| 3,937,105 | 2/1976 | Arai et al. | 74/846 |
| 3,942,614 | 3/1976 | Thompson | 192/4 A |
| 4,065,983 | 1/1978 | Mimura | 74/625 |
| 4,246,990 | 1/1981 | Strantz | 192/4 C |
| 4,262,783 | 4/1981 | Scarrott et al. | 192/0.04 |
| 4,271,728 | 6/1981 | Wakamatsu | 74/866 |
| 4,271,728 | 6/1981 | Wakamatsu | 74/866 |
| 4,275,618 | 6/1981 | Bale | 74/878 |
| 4,291,586 | 9/1981 | Buetemeister | 74/335 |
| 4,312,248 | 1/1982 | Sugimoto et al. | 74/861 |
| 4,324,153 | 4/1982 | Sugimoto et al. | 74/866 |
| 4,324,322 | 4/1982 | Sibeud | 192/0.032 |
| 4,339,962 | 7/1982 | Babel | 74/335 |
| 4,428,248 | 1/1984 | Broucksau et al. | 74/335 |
| 4,493,228 | 1/1985 | Vukovich et al. | 74/858 |
| 4,495,457 | 1/1985 | Stahl | 74/424.1 |
| 4,541,609 | 9/1985 | Smith | 251/129.03 |
| 4,558,612 | 12/1985 | Shimizu et al. | 74/844 |
| 4,570,765 | 2/1986 | Makita | 192/139 |
| 4,583,171 | 4/1986 | Hara et al. | 364/424 |
| 4,602,528 | 7/1986 | Bailey | 74/861 |
| 4,621,328 | 11/1986 | Arai et al. | 364/424.1 |
| 4,638,690 | 1/1987 | Hattori et al. | 74/866 |
| 4,639,646 | 1/1987 | Harris et al. | 318/139 |
| 4,664,217 | 5/1987 | Welch et al. | 74/337.5 |
| 4,776,424 | 10/1988 | Naito | 74/866 X |
| 4,817,471 | 4/1989 | Tary | 74/866 |
| 4,821,590 | 6/1989 | Tary et al. | 74/335 |
| 4,821,607 | 4/1989 | Kawai | 74/866 |
| 4,823,643 | 4/1989 | Koshizawa | 74/866 |
| 4,825,831 | 5/1989 | Kawai | 123/360 |
| 4,825,993 | 5/1989 | Kurihara et al. | 192/0.092 |
| 4,841,793 | 6/1989 | Leigh-Monstevens et al. | 74/335 |
| 4,841,815 | 6/1989 | Takahashi | 74/866 |
| 4,848,529 | 7/1989 | Kurihara et al. | 192/0.076 |
| 4,849,899 | 7/1989 | Cote et al. | 364/424.01 |
| 4,892,014 | 1/1990 | Morell et al. | 74/866 |

OTHER PUBLICATIONS

SAE Paper C247/85.
SAE Paper 852292.
SAE Paper 845094.
SAE Paper 861050.
Artile Entitled "Allison Transmissions Electronic Control for On-Highway Applications".

ELECTRIC SHIFT AND TRANSFER CASE APPARATUS WITH CONTROL SYSTEM THEREFORE

BACKGROUND OF THE INVENTION

This invention relates to an electric shift apparatus especially suited for use with a motor vehicle having an automatic transmission.

Motor vehicles since their inception having required some manner of gear change mechanism to satisfy the varying torque and speed requirements encountered during a typical duty cycle of a motor vehicle. For many years these gear change mechanisms were manual in the sense that they required an operator input from a shift lever or the like to effect each desired gear change ratio. More recently, so called "automatic" transmissions have become popular in which much of the shifting is done without operator input in response to sensed speed and throttle opening parameters. These automatic transmissions typically include a mode select member positioned on the transmission housing and movable between a plurality of selected positions corresponding to a respective plurality of shift modes within the transmission. The mode select member is typically moved between the several shift positions by a cable or linkage mechanism extending from the mode select member to a suitable gear selector lever located in the passenger compartment of the vehicle. The automatic transmission also typically include valving devices within the transmission to selectively shift the transmission automatically between a plurality of forward shift positions. These valving devices are typically selectively positioned in response to a balancing of various input parameters so as to provide automatic shift points as between the various forward speeds of the transmission with the input parameters typically including throttle position and vehicle speed. It has also become increasingly popular in recent years to couple the output of the transmission to a transfer case so as to provide two and four wheel operation for the motor vehicle. The shifting of the transfer case between its two and four wheel modes is typically accomplished by a mechanical lever or linkage.

Various proposals have been made to provide electric control for the various shifting requirements of a modern day motor vehicle transmission assembly. However, these electric control proposals have been disjointed in the sense that they address only one shifting requirement of a transmission assembly. Prior art attempts to electrically control automatic transmissions have also been limited in their commercial success because of the slow or imprecise shifting action or because of excessive warranty and maintenance costs associated with the electric control system.

SUMMARY OF THE INVENTION

This invention is directed to the provision of a control system for an automatic transmission assembly of a motor vehicle which provides complete and precise electronic control of all of the shifting requirements of the transmission assembly.

The invention control system is intended for use with a motor vehicle having an automatic transmission assembly having a plurality of transmission shift modes. According to the invention, the control system includes a control module adapted to be mounted in the passenger compartment of the vehicle and including a plurality of shift select positions corresponding respectively to the transmission shift modes and means operative in response to operator selection of each shift select position to generate a shift signal representative of the selected shift mode; and an electronic logic module receiving input signals comprising the shift signals, a vehicle speed signal, and a transmission present position signal and operative in response to operator selection of the shift positions to process the input signals in a manner to generate a first set of command signals including a command signal corresponding to each shift mode of the transmission and operative to process the input signals in a manner to generate a second set of command signals; first power means receiving the first set of command signals and operative to selectively shift the transmission between the transmission shift modes; and second power means receiving the second set of command signals and operative to perform further shifting operations in the transmission assembly unrelated to the shifting of the transmission between the transmission shift modes. This arrangement provides a simple and effective means for controlling all of the shifting requirements of the transmission.

In one application of the invention, the transmission assembly includes an automatic transmission having a plurality of transmission shift modes including a plurality of forward drive modes; the first power means is operative to selectively shift the transmission between the transmission shift modes in response to receipt of the first set of command signals; and the second power means is operative to selectively shift the transmission between its forward drive positions in response to receipt of the second set of command signals. This arrangement provides a convenient and simple means of electrically controlling both the shifting of the transmission between its various modes and the internal shifting of the transmission between its various forward speed positions.

In another application of the invention, the transmission assembly includes an automatic transmission having a plurality of shift modes and a transfer case drivingly connected to the transmission output and having two and four wheel shift positions; the control module further includes further shift select positions corresponding to the two and four wheel shift positions of the transfer case and further means operative in response to operator selection of each transfer case position to generate a further shift signal representative of the selected transfer case position; the further shift signals are inputted to the logic module; the first power means is operative to selectively shift the transmission between the transmission modes in response to receipt of the first set of command signals; the second set of command signals is respectively generated in response to operator selection of the further shift positions; and the second power means is operative to selectively shift the transfer case between its two and four wheel drive positions in response to receipt of the second set of signals.

In the disclosed embodiments of the invention, the power means for shifting the transmission between its various shift modes comprises a power module adapted to be positioned proximate the vehicle transmission and including an electric motor and encoder means operative to generate a transmission shift position signal indicative of the present shift position of the transmission; the power means for shifting the transfer case between its shift modes comprises a second power module adapted to be positioned proximate the transfer case and including a second electric motor and encoder means operative to generate a transfer case shift position signal indicative of the present shift position of the transfer case; and the power means for controlling the shifting of the transmission between its several forward drive speeds comprises a plurality of solenoids respectively drivingly connected to the transmission valving devices controlling the internal shifting of the transmission.

DESCRIPTION OF THE PREFERRED EMBODIMENTS

Figure 1:
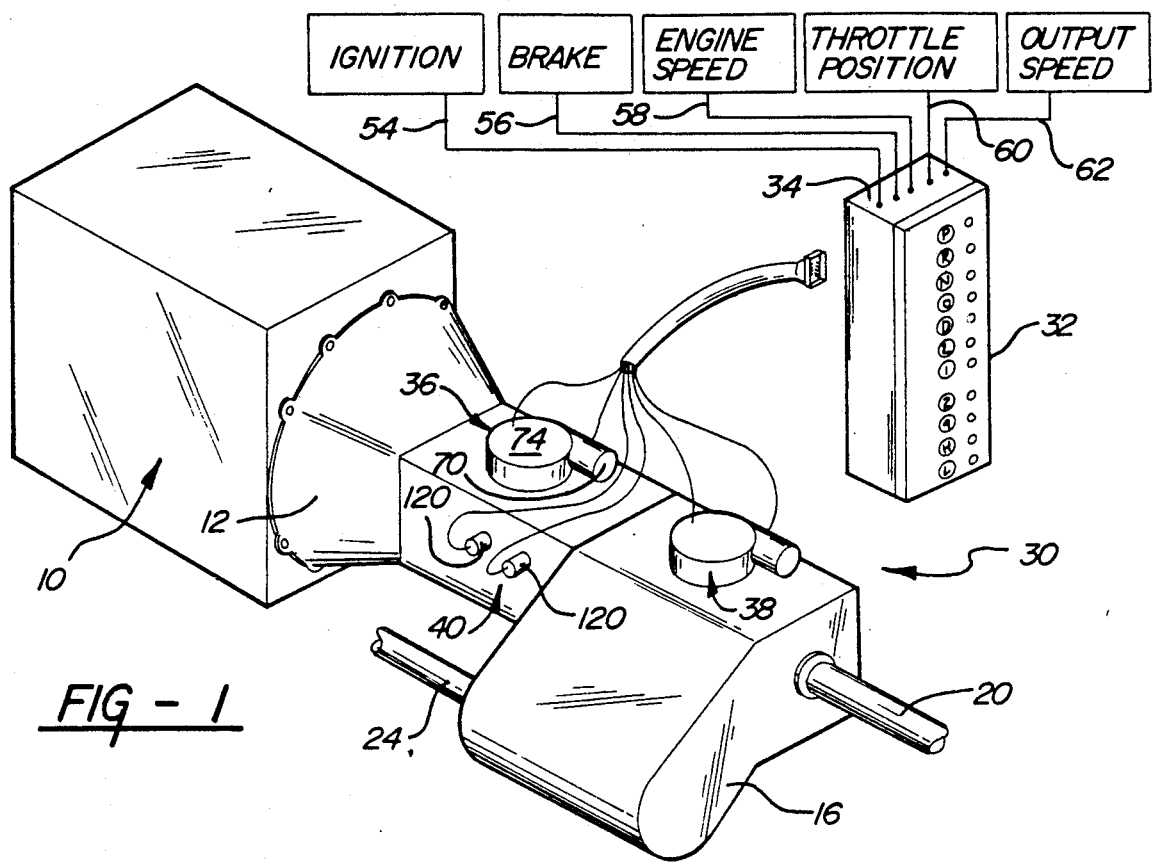
FIG. 1 is a somewhat schematic perspective view of a motor vehicle drive train employing a control system according to the invention.
Figure 2:
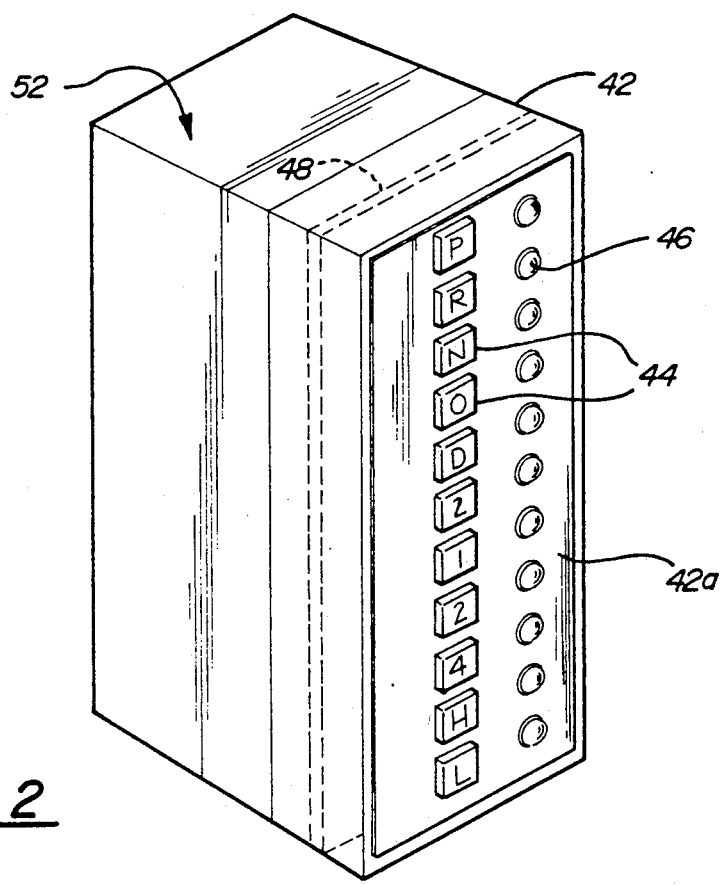
FIG. 2 is a detail view of a control and logic module employed in the control system of FIG. 1.
Figure 3:
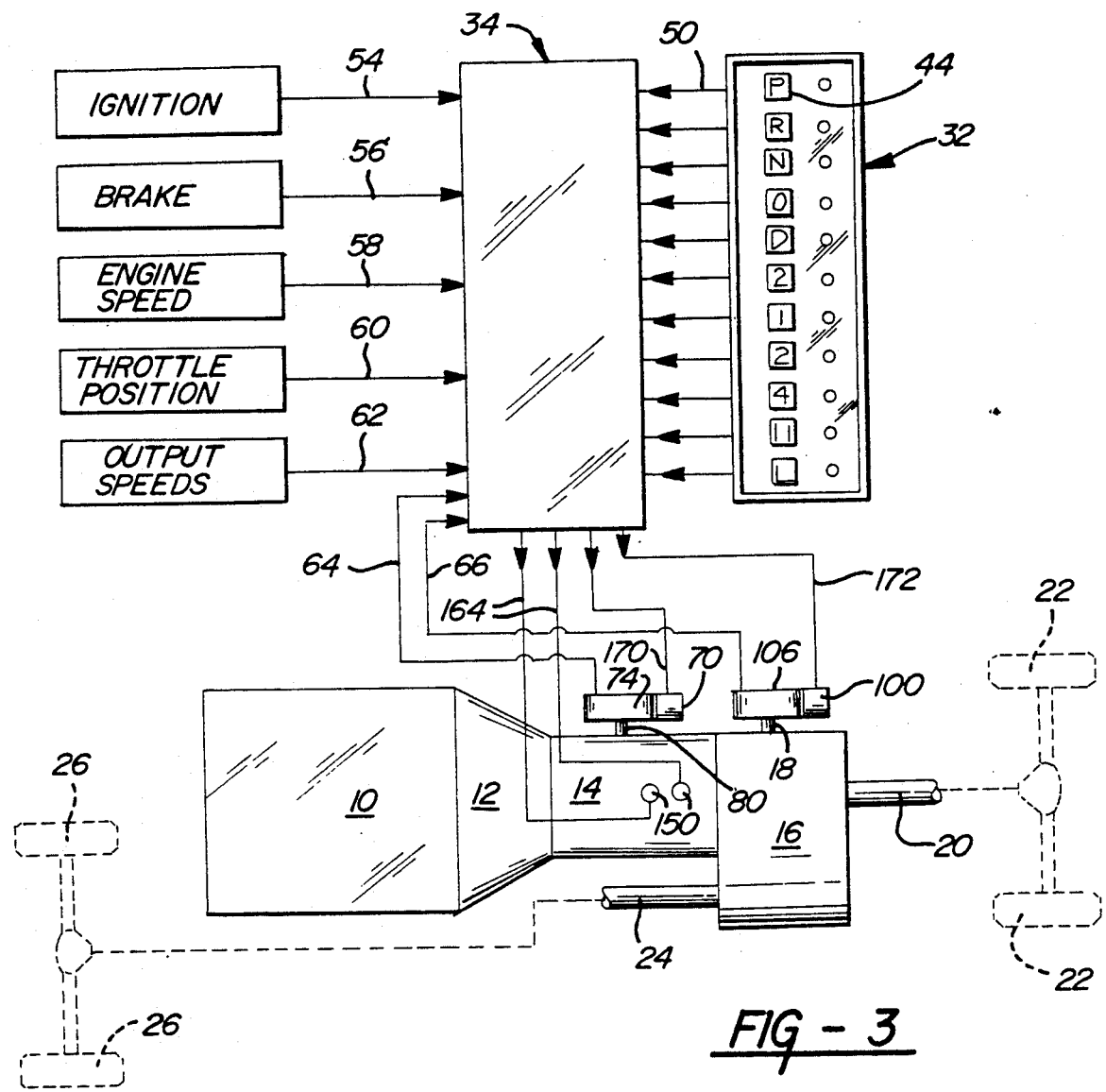
FIG. 3 is a diagrammatic view of the invention control system.
Figure 4:
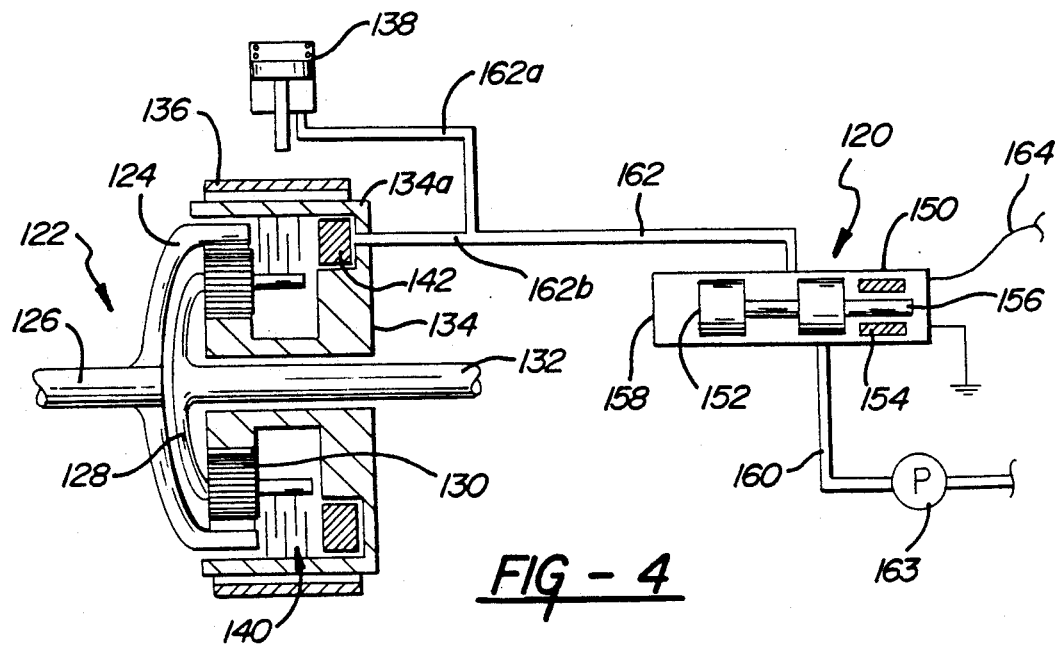
FIG. 4 is a fragmentary diagrammatic view of a portion of the invention control system.
Figure 5:
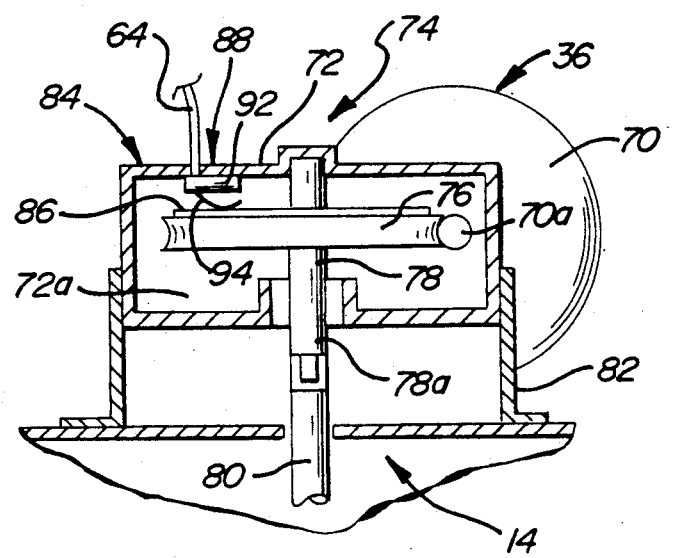
FIG. 5 is a cross-sectional view of a power module employed in the invention control system.
Figure 6:
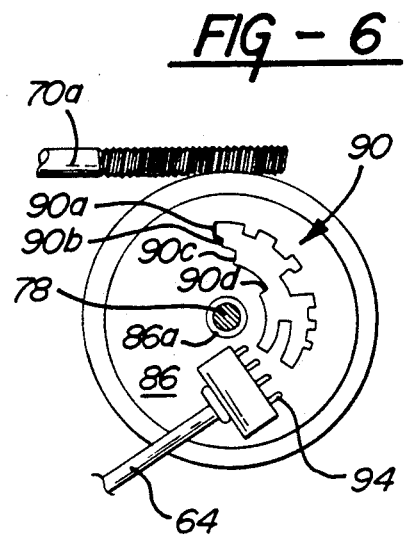
FIG. 6 a detail view of a portion of the power module of FIG. 5.
Figure 7:
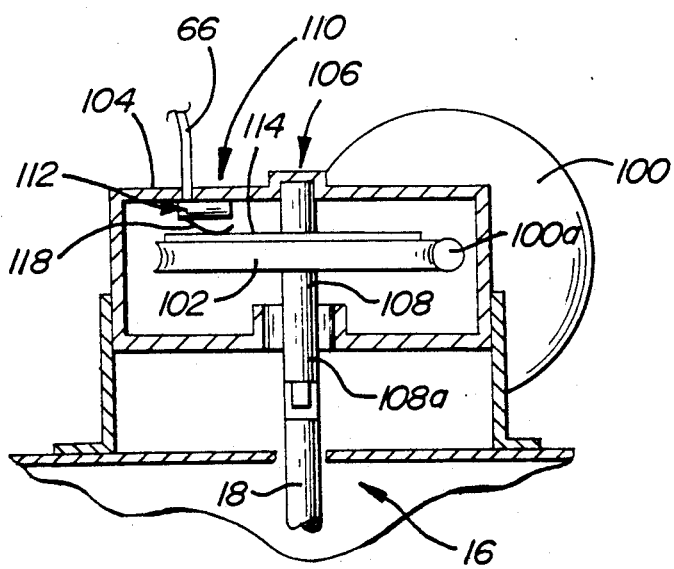
FIG. 7 a cross-sectional view of a further power module employed in the invention control system.
Figure 8:
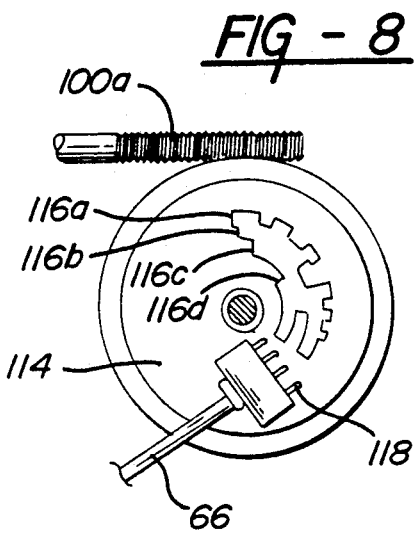
FIG. 8 is a detail view of a portion of the power module of FIG. 7.

The motor vehicle power train shown in FIG. 1 includes an engine 10, a torque converter 12, a transmission 14, and a transfer case 16. Engine 10 is of the internal combustion type and includes a throttle (not shown) controlling the delivery of a combustible mixture to the engine.

Converter 12 is of known form and comprises a viscous coupling interposed between the output of the engine and the input of the transmission 14.

Transmission 14 is of the automatic transmission type and may take various forms but preferably includes a plurality of planetary gear sets which are selectively controlled to provide the various shift modes of the transmission. The control of the planetary gear sets is preferably achieved by hydraulic means.

Transfer case 16 operates in known manner to provide either two wheel or four wheel drive for the associated motor vehicle. The transfer case also preferably provides high and low ranges. The internal workings of the transfer case are not part of the present invention but the transfer case is preferably of the type in which a single mode selector shaft 18 may be rotated to provide high and low range operation as well as two and four wheel drive operation of the transfer case. An arrangement of this type is shown for example in U.S. Pat. No. 4,664,217. It will be understood that the transfer case 16 function in its two wheel drive position to drive output shaft 20 to drive rear wheels 22 while maintaining front drive shaft 24 in a neutral condition and functions in the four wheel drive operation to provide power both to rear drive shaft 20 and front drive shaft 24 so as to provide power both to rear wheels 22 and front wheels 26.

The control system 30 of the invention includes a control module 32, a logic module 34, a first power module 36, a second power module 38, and power means 40.

Control module 32 includes a housing 42 including a facia 42a and a plurality of push-buttons 44 positioned in facia 42a in vertically spaced relation and corresponding to the available shift positions or modes of the transmission 14 and to the available shift positions or modes of the transfer case 16. Specifically, buttons 44 include buttons corresponding to park, reverse, neutral, overdrive, drive, second gear and first gear shift positions for the transmissions as well as two wheel, four wheel, high range and low range shift positions for the transfer case 16. An indicator light 46 is provided in association with each push-button with the light being illuminated in response to depression of the associated push-button so as to indicate the mode or modes in which the power train is operating. Buttons 44 coact in known manner with a printed circuit board 48 to generate suitable electrical shift signals in response to respective depression of the buttons 44. The shift signals are provided as inputs to logic module 34 via a plurality of leads 50 respectively associated with each push-button 44 and operate to transmit a shift signal to the input module in response to depression of the respective push-button.

Logic module 34 includes a housing 52 suitably secured to the housing 42 of control module 32 so as to form a unitary assembly with the control module for mounting, for example, in a suitable opening in the instrument panel of the associated motor vehicle with the buttons 44 presented at the exposed space of the instrument panel for ready access by the operator of the motor vehicle. Logic module 34 could be constructed in hardware logic, either as a programmable logic array or gate array, but preferably is constructed as a programmed microprocessor circuit.

In addition to the input leads 50 from control module 32, logic module 34 further receives an ignition input signal via a lead 54. a brake input signal via a lead 56, an engine speed input signal via a lead 58, an engine throttle position signal via a lead 60, and an output speed signal via a lead 62.

The output speed signal inputted to the logic module via lead 62 preferably is taken from the speed of output shaft 20 of transfer case 16. Logic module 34 also receives a present transmission shift position signal via a lead 64 and a present transfer case shift position signal via a lead 66.

Power module 36 includes an electric dc motor 70 rigidly secured to the housing 72 of speed reduction unit 74. The output shaft 70a of motor 70 extends into the interior 72a of speed reduction unit housing 72 and defines a worm gear for meshing coaction with a worm wheel 76 disposed within the housing 72 so that rotation of output shaft 70a in response to energization of motor 70 rotates worm wheel 76 and thereby a central shaft 78 on which the worm wheel is mounted. Shaft 78 is suitably journaled in a vertical disposition in housing 72 and projects at its lower end out of the lower end of the housing to define a lower end shaft portion 78a for releasable, coupling coaction with a mode selector shaft 80 extending out of the transmission housing and operative in known manner in response to rotation thereof to move a shuttle valve within the transmission between valve positions respectively corresponding to the park, reverse, neutral, overdrive, drive, second gear and first gear modes of the transmission. Power module 36 is secured to the transmission housing for example by brackets 82 secured to speed reduction unit housing 72.

Power module 36 further includes an encoder assembly 84 which is operative to sense the present shift position or mode of the transmission and generate an encoded signal representative of the sensed present shift position for transmission to the logic module 34 via lead 64.

Encoder assembly 84 includes an encoder wheel 86 and a pick-up device 88. Encoder wheel 86 may be formed for example of a suitable plastic material and is secured to the upper face of worm wheel 76 within the housing space 72a. Encoder wheel 86 includes a central aperture 86a passing shaft 78 and further includes code indicia 90 provided on the exposed upper face of the wheel and arranged around four arcuate tracks 90a, 90b, 90c and 90d centered on the centerline of the encoder wheel.

Pick-up device 88 includes a plastic body member 92 mounting a plurality of flexible resilient contact fingers 94 for respective coaction with the four indicia tracks 90a, 90b, 90c and 90d. In addition to four fingers 94 for respective engagement with the four indicia tracks, a fifth finger is provided to provide a ground for the system. The information gathered by fingers 94 from the indicia tracks is transmitted to the logic module 34 via lead 64 so that the logic module at all times is aware of the present position of the transmission. Further details of the construction and operation of the encoder assembly 84 are disclosed in U.S. Pat. No. 4,817,471 assigned to the assignee of the present invention.

Power module 38 is generally similar to power module 36 and includes an electric dc motor 100 having an output shaft 100a defining a worm gear drivingly engaging a worm wheel 102 positioned in the housing 104 of a gear reduction unit 106 and including a central driven shaft 108 vertically journaled in the housing and extending at its lower end 108a out of the lower end of the housing for releasable coupling engagement with the upper end of transfer case mode selector shaft 18. An encoder assembly 110 positioned within housing 104 includes a pick-up device 112 and an encoder wheel 114. Encoder wheel 114 is secured to the upper face of worm wheel 102 and defines code indicia 116 along its exposed upper face arranged along four arcuate tracks 116a, 116b, 116c and 166d centered on the centerline of the encoder wheel and coacting with fingers 118 of pickup device 112 to provide a coded signal representative of present transfer case position for transmission via lead 66 to logic module 34.

Power means 40 comprise a plurality of solenoid valves 120 corresponding in number to the number of planetary gear sets provided in the automatic transmission 14. For example, in the example shown, two solenoid valves 120 are provided for respective coaction with two planetary gear sets 122 disposed serially within automatic transmission 14 and coacting in response to selective engagement and disengagement of the various sun, planet and ring gears of each gear set to provide the various transmission modes.

Each planetary gear set 122, in known manner, includes a ring gear 124 driven by the input shaft 126 of the gear set; a planet carrier 128 carrying a plurality of planet gears 130 and drivingly connected to the output shaft 132 of the gear set; a sun gear 134; a band 136 encircling outer sun gear portion 134a and moved respectively into clamping and released position with respect to the sun gear portion 134a via a servomotor 138; and a multiple disk clutch 14 including disks carried by the planet carrier and by the sun gear and engagable and disengagable in response to axial movement of an annular piston 142 carried by the sun gear.

Each solenoid valve 120 includes a solenoid 150 and a spool valve 152. Each solenoid 150 includes a solenoid coil 154 and a core 156 drivingly connected to spool valve 152 so that energization and deenergization of the coil 154 moves the spool valve 152 within the housing 158 of the spool valve to selectively provide communication between, and block communication between, an inlet hydraulic line 160 and an outlet hydraulic line 162. Hydraulic line 162 includes branches 162a and 162b connected respectively to servo 138 and annular piston 142 so that, with spool valve 152 in a position to establish communication between lines 160 and 162, pressurized fluid from a pump 163 is delivered through the spool valve, through conduit 162, and through branches 162a and 162b respectively to servo 138 and piston 142 so as to apply clutch 140 and release band 136. It will be understood that with band 136 in an applied or contracted position and clutch 140 released the sun gear of the planetary gear set is held stationary to provide a speed reduction through the gear set and with the band released and clutch 140 applied the sun is locked to the planet carrier to provide a direct drive through the planetary gear set. Each solenoid 150 is energized and deenergized by logic module 34 via a lead 164 interconnecting the solenoid and the logic module.

It will be seen that logic module 34 is always aware of the vehicle ignition situation; the condition of the vehicle braking system; the engine speed; the throttle position of the engine; the output speed of shaft 20; the present position of the transmission; and the present position of the transfer case. When the operator presses a button 44 corresponding to a desired transmission mode or shift position, logic module 34 compares the input indicating the desired transmission position with the input indicating the present transmission condition and, if the signals differ, the logic module generates an output signal via a lead 170 to motor 70 to rotate the motor until the present gear matches the desired gear as indicated by the depressed push-button 44. The logic process includes a determination of which shifts are upshifts (counterclockwise motor rotation) and which shifts are downshifts (clockwise motor rotation) according to known Boolean equations, such for example as the equations disclosed in U.S. Pat. No. 4,817,471 assigned to the assignee of the present invention.

The logic module also examines other inputs to the logic module before it determines whether to execute the command requested by the depressed push-button and, minimally, looks at the speed signal being provided by lead 62 to ensure that the indicated vehicle speed is consistent with the requested shift. If the speed indicated is incompatible with the requested shift, the logic module will refuse to complete the command unless and until the speed signal achieves a value within the acceptable range of values for the particular gear selected. The logic module thus examines input signals comprising the desired shift signal, a vehicle speed signal, and a present transmission position signal and operates to process these input signals in a manner to generate a first set of command signals including a command signal corresponding to the selected transmission shift mode.

The logic module also looks at various input signals and processes these signals in a manner to generate a second set of command signals for transmittal to solenoid valves 120 to provide shifting of the transmission between the various forward gears with the transmission in a forward gear mode. Specifically, to control shifting of the transmission between the various forward gear modes, logic module 34 looks at the present gear signal, an engine speed signal, an output speed signal, and a throttle position signal and processes these signals in a manner to generate a second set of command signals for transmission to solenoid valves 120 to selectively energize and deenergize the valves in a manner to achieve the shifting between the various forward speeds of the transmission at desired throttle position/engine speed/and vehicle speed values, as determined by a map in the memory of module 34, so as to assure smooth and effective forward shifting of the transmission during acceleration and smooth and effective downward shifting of the transmission during deceleration. Energization of the solenoid valves, as previously indicated, has the effect of establishing fluid communication between lines 160 and 162 so as to actuate clutch 140 and aCtuate servo 138 in a sense to release band 136 and thereby convert the associated planetary gear set from a speed reduction mode to a direct drive mode. As will be understood, the two serially arranged planetary gear sets 122 are selectively shifted between their speed reduction and direct drive modes to provide, in combination, the various forward speeds of the transmission.

Logic module 34 also operates in response to operator selection of a push-button 44 corresponding to a mode of the transfer case to position the transfer case in the desired mode if the requested mode is appropriate. Specifically, for purposes of shifting the transfer case, the module 34 looks at the present transfer case position, engine speed, and vehicle output speed, and processes these input signals in a manner to generate a set of command signals for the transfer case to determine whether or not the requested shift should be executed and, if so, to determine the sense and duration of the signal to be provided to power module motor 100 via a lead 172.

As with the processing procedure with respect to requested shifts of the transmission, the process by which the input signals relating to the transfer case are evaluated includes an indication of which shifts are up shifts (counterclockwise motor rotation) and which shifts are down shifts (clockwise motor rotation) according to known Boolean equations, such for example as the Boolean equations disclosed in U.S. Pat. No. 4,817,471. It will be understood that, with respect to both the power module 38 and power module 36, the energization of the associated motor, with the resultant turning of the associated mode select member, continues until the present transmission position or mode, or the present transfer case position or mode, as tracked by the fingers of the encoder device tracking the coded indicia on the associated encoder wheel, indicates that the present position corresponds to the requested position, whereupon the associated motor is dynamically braked in a manner to stop the associated mode select member in an angular position corresponding to the requested position of the transmission or of the transfer case.

The invention control system will be seen to provide a simple and effective means of electronically controlling all of the required shift functions of a modern day automatic transmission as well as, if desired, all of the shift functions of an associated transfer case. The use of a common logic module, which examines different sets of input data and produces different sets of command signals for each of the various shifting operations required of the transmission and/or of the transfer case, allows a compact and economical control package to be provided to the motor vehicle manufacturer and allows careful quality control since all of the modular units may be carefully and thoroughly pretested prior to delivery to the motor vehicle manufacturer so that the manufacturer may be assured that, following total assembly of the vehicle, all of the components of the electronic control system controlling the transmission assembly will function properly.

Whereas a preferred embodiment of the invention has been illustrated and described in detail, it will be apparent that various changes may be made in the disclosed embodiment without departing from the scope or spirit of the invention.

I claim:

1. A control system for a motor vehicle of the type including a passenger compartment and a transmission assembly including an automatic transmission having a mode select member having a plurality of discrete shift positions corresponding respectively to the shift modes of the transmission and operative in response to movement of the mode select member to its various shift positions to shift the transmission to the respective transmission shift modes, said control system comprising:

A) a control module adapted to be mounted in the passenger compartment and including a plurality of shift select positions corresponding respectively to the shift modes of the automatic transmission and means operative in response to operator selection of each shift select position to generate a shift signal representative of the selected shift mode;

B) an electronic logic module receiving input signals comprising said shift signals, a vehicle speed signal, and a transmission present position signal and operative 1) in response to operator selection of said shift positions to process said input signals in a manner to generate a first set of command signals including a command signal corresponding to each automatic transmission shift mode, and 2) to process said input signals in a manner to generate a second set of command signals;

C) a power module, adapted to be drivingly connected to the mode select member, receiving said first set of command signals and operative in response to said first set of command signals to selectively move the mode select member between its various discrete shift positions to selectively shift the automatic transmission between its various shift modes; and D) power means receiving said second set of command signals and operative to perform further shifting operations in the transmission assembly unrelated to the shifting movement of the mode select member by the power module.

2. A control system according to claim 1 wherein the automatic transmission shift modes include a plurality of forward drive modes, said logic module further receives an input signal corresponding to throttle position, said second set of command signals is generated in accordance with the vehicle speed and throttle position input signals, and said power means is operative to selectively shift the transmission between its forward drive modes in response to receipt of said second set of command signals.

3. A control system according to claim 1 wherein the transmission assembly further includes a transfer case drivingly connected to the automatic transmission output and having two and four wheel drive modes and wherein
   E) said control module includes further shift select positions corresponding to the two and four wheel drive modes of the transfer case and further means operative in response to operator selection of each transfer case position to generate a further shift signal representative of the selected transfer case positions;
   F) said further shift signals are inputted to said logic module;
   G) said second set of command signals is respectively generated in response to operator selection of said further shift members; and
   H) said power means in operative to selectively shift the transfer case between said two and four wheel drive positions in response to receipt of said second set of command signals.

4. A transmission control system for a motor vehicle of the type including a passenger compartment and an automatic transmission having a plurality of shift positions including a plurality of forward drive positions and means for automatically shifting the automatic transmission between the forward drive positions in response to sensed vehicle speed and throttle position signals, said control system comprising:
   A) a control module adapted to be mounted in the passenger compartment and including a plurality of shift select positions corresponding respectively to the transmission shift positions and means operative in response to operator selection of each shift select position to generate a shift signal representative of the selected shift position; and
   B) control means, including an electronic logic module receiving said shift signals and vehicle speed, throttle position, and present transmission shift position signals,
      1) operative in response to operator selection of a particular shift select position to move the mode select member to shift the transmission to the selected shift position, and
      2) operative with the transmission in a drive position to selectively shift the transmission between its forward drive positions in accordance with the received vehicle speed and throttle position signals.

5. A control system according to claim 4 wherein:
   C) said control means further includes a power module adapted to be positioned proximate the vehicle transmission adjacent the mode select member and including an electric motor, and encoder means operative to generate a transmission shift position signal indicative of the present shift position of the transmission;
   D) said present shift position signal is inputted to said logic module; and
   E) said logic module is operative to generate an appropriate electric motor drive signal in response to operator selection of a particular shift select position to energize said motor in a sense to move the mode select member to shift the tnarsmission to the selected shift position.

6. A control system according to claim 4 wherein the automatic transmission includes valving devices operative to control the shifting of the transmission between its forward drive positions; and wherein
   C) said control means further include electric power devices associated with said valving devices; and
   D) said logic module is operative to generate power device command signals in accordance with the received vehicle speed and throttle position signals to energize said electric power devices and actuate said valving devices in a manner to shift the transmission between its forward drive positions.

7. A control system according to claim 6 wherein:
   E) said electric power devices comprise solenoids respectively drivingly connected to the transmission valving devices.

8. A control system according to claim 6 wherein:
   E) said control means further includes a power module adapted to be positioned proximate the vehicle transmission adjacent the mode select member and including an electric motor, and encoder means operative to generate a transmission shift position signal indicative to the present shift position of the transmission;
   F) said present shift position signal is inputted to said logic module; and
   G) said logic module is operative to generate an appropriate electric motor drive signal in response to operator selection of a particular shift select position to energize said motor in a sense to move the mode select member to shift the transmission to the selected shift position.

9. A control system according to claim 8 wherein:
   H) said electric power devices comprises solenoids respectively drivingly connected to the transmission valving devices.

10. A control system according to claim 4 wherein:
    C) said control module includes a housing defining a facia and said shift select positions are defined by a plurality of push-buttons positioned in said facia; and
    E) said logic module includes a logic module housing physically secured to said control module housing to form a unitary assembly for positioning in the passenger compartment of the motor vehicle.

11. A control system for a motor vehicle of the type including a passenger compartment and an automatic transmission having a plurality of shift positions and a transfer case drivingly connected to the transmission output and having two and four wheel shift positions, said control system comprising:
    A) a control module adapted to be mounted in the passenger compartment and including
       1) a plurality of shift select positions corresponding respectively to the transmission shift positions and the transfer case shift positions, and
       2) means operative in response to operator selection of each shift select position to generate a shift signal representative to the selected shift position; and
    B) control means, including an electronic logic module receiving vehicle speed signals and said shift signals, operative in response to operator selection of a particular shift select position to shift the transmission or transfer case to the selected shift position.

12. The control system according to claim 11 wherein:
    C) said control means further includes a power module adapted to be positioned proximate the vehicle transmission and including an electric motor, and encoder means operative to generate a transmission shift position signal indicative of the present shift position of the transmission;

D) said present shift position signal is inputted to said logic module; and

E) said logic module is operative to generate an appropriate electric motor drive signal in response to operator selection of a particular transmission shift select position to energize said motor in a direction and to an extent to shift the transmission to the selected shift position.

13. A control system according to claim 11 wherein:

C) said control module includes a housing defining a facia;

D) said shift select positions are defined by a plurality of push-buttons positioned in said facia; and E) said logic module includes a logic module housing physically secured to said control module housing to form a unitary assembly for positioning in the passenger compartment of the motor vehicle.

14. A control system according to claim 11 wherein:

C) said control means further includes a power module adapted to be positioned proximate the vehicle transfer case and including an electric motor, and encoder means operative to generate a transfer case shift position signal indicative to the present shift position of the transfer case;

D) said present transfer case shift position signal is inputted to said logic module; and E) said logic module is operative to generate an appropriate electric motor drive signal in response to operator selection of a particular transfer case shift select position to energize said motor in a sense to shift the transfer case to the selected transfer case shift position.

15. A control system according to claim 14 wherein:

F) said control means further includes a second power module adapted to be positioned proximate the vehicle transmission and including a second electric motor, an encoder means operative to generate a transmission shift position signal indicative of the present shift position of the transmission;

G) said present transmission shift position signal is inputted to said logic module; and H) said logic module is operative to generate an appropriate electric motor drive signal in response to operator selection of a particular transmission shift select position to energize said second motor in a sense to shift the transmission to the selected transmission shift position.

* * * * *